(12) United States Patent
Tenne (10) Patent No.: US 8,900,459 B2
(45) Date of Patent: Dec. 2, 2014

(54) VERSATILE WATER PURIFICATION SYSTEMS AND METHODS

(75) Inventor: Gil Tenne, Shoham (IL)

(73) Assignee: PureSafe Water Systems, Inc., Plainview, NY (US)

( * ) Notice: Subject to any disclaimer, the term of this patent is extended or adjusted under 35 U.S.C. 154(b) by 519 days.

(21) Appl. No.: 12/100,137

(22) Filed: Apr. 9, 2008

(65) Prior Publication Data
US 2009/0255874 A1 Oct. 15, 2009

(51) Int. Cl.
*B01D 61/04* (2006.01)
(Continued)

(52) U.S. Cl.
CPC ............. *E03B 3/04* (2013.01); *B01D 61/025* (2013.01); *B01D 61/08* (2013.01); *C02F 9/005* (2013.01); *C02F 1/001* (2013.01); *C02F 1/32* (2013.01); *C02F 1/441* (2013.01); *C02F 1/68* (2013.01); *C02F 1/78* (2013.01); *C02F 2103/08* (2013.01); *C02F 2201/009* (2013.01); *C02F 2209/006* (2013.01); *C02F 2209/03* (2013.01); *C02F 2209/04* (2013.01); *C02F 2209/05* (2013.01)
USPC ......... 210/652; 210/760; 210/748.1; 210/806

(58) Field of Classification Search
CPC ...... B01D 36/00; B01D 36/02; B01D 37/043; B01D 37/045; B01D 37/046; B01D 37/041; B01D 2221/08; B01D 2221/12; B01D 2221/02; B01D 2221/04; B01D 2311/2619; B01D 2311/14; B01D 2311/04; B01D 2311/02; B01D 2311/061; B01D 2313/10; B01D 2313/105; B01D 2317/02; C02F 9/005; C02F 1/001; C02F 1/441; C02F 1/78; C02F 1/32; C02F 1/68; C02F 1/685; C02F 1/686; C02F 1/687; C02F 2209/05; C02F 2209/04; C02F 2209/03; C02F 2209/06; C02F 2103/08; C02F 2103/007; C02F 2201/009; C02F 2201/008

USPC .............. 210/760, 748.1, 143, 253, 652, 806; 15/304
See application file for complete search history.

(56) References Cited

U.S. PATENT DOCUMENTS 3,138,546 A * 6/1964 Muller ........................... 202/205
3,932,278 A * 1/1976 Meidl et al. ................... 210/794
(Continued)

FOREIGN PATENT DOCUMENTS

| FR | 2780718 A1 | 1/2000 |
|---|---|---|
| WO | 0012435 A1 | 3/2000 |
| WO | 0105484 A1 | 1/2001 |

OTHER PUBLICATIONS

International Search Report for Application No. PCT/US09/39668 mailed Sep. 21, 2009.

(Continued)

*Primary Examiner* — Katherine Zalasky
(74) *Attorney, Agent, or Firm* — Weiss & Arons LLP (57) ABSTRACT

Systems and methods for versatile water purification. The methods may include floating a raft on a source of water to be purified. The raft may provide inlet for the water. The methods may include pumping the water and selectively pre-treating the pumped water by chemical injection prior to filtration. The methods may include passing the pumped water, sequentially, through a multi media filter to produce filtered water, into a plurality of reverse osmosis columns to produce osmosis water, and into a buffer tank. The methods may include injecting ozone into water pumped from the tank, and selectively returning the ozone-injected water to the tank via a first valve. Via a second valve, the ozone-injected water may be passed to a bottle washing station for washing and sterilization of receptacles to receive purified waters pumped from the tank. Methods may include Ultra Violet and chemical treatment of water prior to dispensing.

18 Claims, 6 Drawing Sheets

(51) Int. Cl.

| | |
|---|---|
| *B01D 61/58* | (2006.01) |
| *E03B 3/04* | (2006.01) |
| *B01D 61/02* | (2006.01) |
| *B01D 61/08* | (2006.01) |
| *C02F 9/00* | (2006.01) |
| *B01D 21/26* | (2006.01) |
| *C02F 1/00* | (2006.01) |
| *C02F 1/32* | (2006.01) |
| *C02F 1/44* | (2006.01) |
| *C02F 1/68* | (2006.01) |
| *C02F 1/78* | (2006.01) |
| *C02F 103/08* | (2006.01) |

(56) References Cited

U.S. PATENT DOCUMENTS

| | | | |
|---|---|---|---|
| 5,112,477 A | | 5/1992 | Hamlin |
| 5,180,438 A | | 1/1993 | Hockh et al. |
| 5,244,579 A | * | 9/1993 | Horner et al. ............. 210/652 |
| 5,587,089 A | * | 12/1996 | Vogel et al. ............... 210/764 |
| 5,597,487 A | | 1/1997 | Vogel et al. |
| 5,911,884 A | | 6/1999 | Boulter |
| 6,058,718 A | * | 5/2000 | Forsberg et al. ............. 62/125 |
| 6,348,155 B1 | | 2/2002 | Conway et al. |
| 2002/0179514 A1 | * | 12/2002 | Anderson et al. ............ 210/258 |
| 2005/0139530 A1 | | 6/2005 | Heiss |
| 2005/0242036 A1 | | 11/2005 | Harris et al. |

OTHER PUBLICATIONS

First Office Action issued by the examiner for Canadian Patent Application No. 2,362,107 mailed Apr. 16, 2009.
Emergency Disaster Relief Water Systems, Energistx Global Water Technologies, as downloaded on Mar. 1, 2011 from URL: http://www.energistx.com/water/GWemergency.html.
Tempest Enviromental Systems, Mobile Water Purification Systems For Fresh, Brackish & Seawater, as downloaded on Mar. 1, 2011 from URL: http://www.aquapura.com/bee.htm.
Lifestream Watersystems Inc., Specification SW8 Commercial Duty Seawater Reverse Osmosis Desalination Systems 11,000 To 31,600 GPD, as downloaded on Mar. 1, 2011 from URL: http/www.lifestreamwater.com/sw8.html.
WorlWater & Solar Technologies, as downloaded on Mar. 1, 2011 from URL: http://www.worldwatersolar.com/2-mobilemax.html.

* cited by examiner

VERSATILE WATER PURIFICATION SYSTEMS AND METHODS

FIELD OF TECHNOLOGY

Aspects of the disclosure relate to systems and methods for water purification. More specifically, the disclosure relates to systems and methods for purifying water with widely varying characteristics.

BACKGROUND

Conventional systems and methods for water purification and desalination are typically directed to processing water with known characteristics. For example, large desalination plants exist that are adapted to process raw water that of exact and known characteristics. However, if the raw water does not possess the required characteristics, then the efficiency of the desalination plants drops precipitously. Thus, conventional desalination plants are not adapted to process different forms of raw water.

It would be desirable to provide systems and methods for water purification that are versatile—i.e., that can purify various forms of raw water such as sea water, brackish water, water contaminated by sewage, and/or other water containing various forms of bacteria, algae, viruses, fungi, other microorganisms, any organic compounds, or mineral compounds which may appear in raw water, such as sulfides, nitrites, nitrates, phosphates, mineral oil-based compounds, metals, various chlorides, etc.

It would be further desirable to provide such a system that is substantially portable—i.e., that can be easily transported to an area in need.

SUMMARY OF THE INVENTION

It is an object of the invention to provide systems and methods for water purification that are both versatile—i.e., that can purify various forms of raw water such as sea water, brackish water, water contaminated by sewage, and/or other water containing various forms of bacteria, algae, viruses, fungi, other microorganisms, any organic compounds, or mineral compounds which may appear in raw water, such as sulfides, nitrites, nitrates, phosphates, mineral oil-based compounds, metals, various chlorides, etc.

It is a further object of the invention to provide such a system that is substantially portable—i.e., that can be easily transported to an area in need.

A method for purification of water according to the invention may include pumping, under computer control, water into a multi media filter. The filter may include a commonly available shell, multi media content (which may be chemicals readily available from any of a number of commonly known sources) and a backwash controller that operates in response to a pressure differential between the input and output, and which can reverse the water flow, as needed, in order to clean the filter.

In certain embodiments of the invention, the incoming water pumped from the "submersible pump" can be selectively injected with ozone, under computerized control, to form ozonated water in order to pre-treat water with known high bacteria content.

The method may also include filtering the water using the multi media filter to provide filtered water. The filtered water may then be pumped, under computer control, into a plurality of reverse osmosis columns. The columns may convert the filtered water into osmosis water having less particulate matter than the filtered water. The osmosis water may be passed to a buffer tank.

The method may also include pumping, under computer control, water from the buffer tank. The water pumped from the buffer tank may be selectively injected with ozone, under computer control, to form ozonated water. The ozonated water may be selectively passed, under computer control, back to the buffer tank via a first valve. The ozonated water may also be selectively passed, under computer control, from the ozone system to a bottle washing station via a second valve.

The water from the buffer tank may be passed to an ultra violet ("UV") system for killing bacteria in the water received from the buffer tank. In addition, the UV may serve to eliminate excess ozone in the water. The water may also be mineralized prior to dispensing the water for drinking.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Those aspects typically take the form of a hardware embodiments having a software embedded in the hardware with a TOUCH SCREEN serving as a user interface. Furthermore, such aspects may take the form of a computer program product stored by one or more computer-readable storage media having computer-readable program code, or instructions, embodied in or on the storage media. Any suitable computer readable mass storage media may be utilized. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
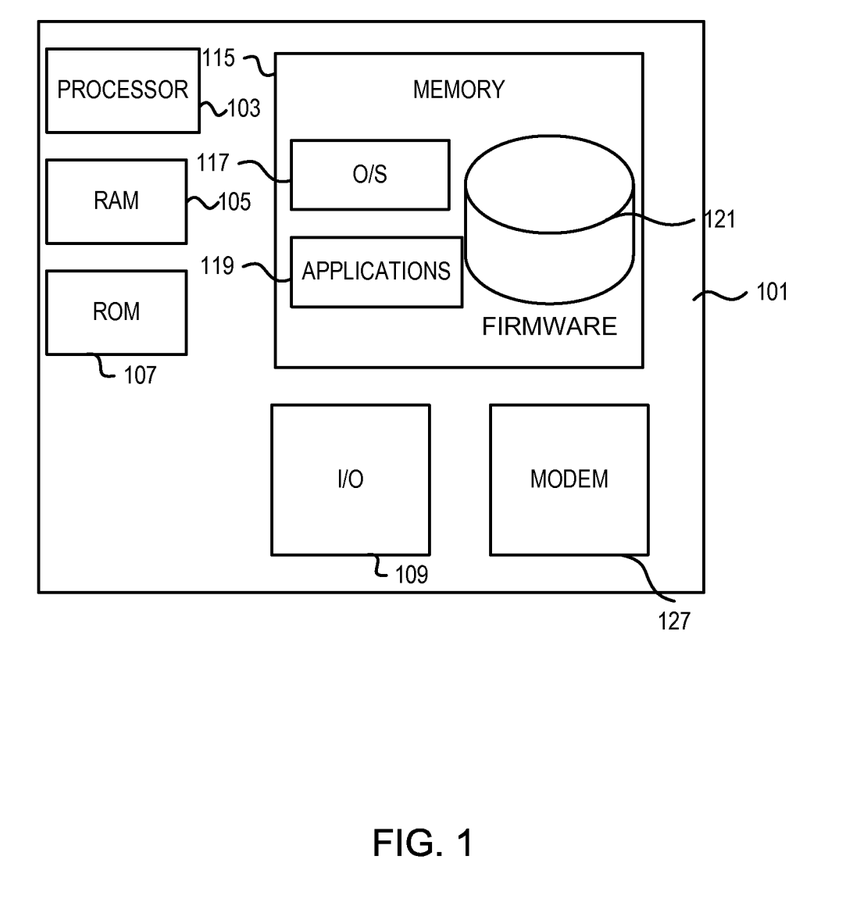
FIG. 1 is a schematic diagram of a general-purpose digital computing environment in which one or more aspects of the present invention may be implemented.

FIG. 1 illustrates a block diagram of a computing device 101 (alternatively referred to herein as a "controller") that may be used as part of a central computing system for an illustrative embodiment of the invention. The computerized controller 101 may have a processor 103 for controlling overall operation of the controller and its associated components, including RAM 105, ROM 107, input/output module 109, and memory 115.

I/O module 109 may include a touch screen, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling controller 101 to perform various functions. For example, memory 115 may store software used by controller 101, such as an operating system 117, application programs 119, and an associated firmware 121. Alternatively, some or all of controller 101 computer executable instructions may be embodied in hardware or firmware (not shown). As described in detail below, firmware 121 may provide centralized storage of system information.

Controller 101 may operate to communicate with other computers using a modem 127 such as a cellular modem or a satellite modem.

Additionally, application program 119 used by controller 101 according to an illustrative embodiment of the invention may include computer executable instructions for invoking user functionality related to communication.

Computing device 101 may also be a mobile terminal including various other components, such as a battery, speaker, and antennas (not shown).

Figure 2:
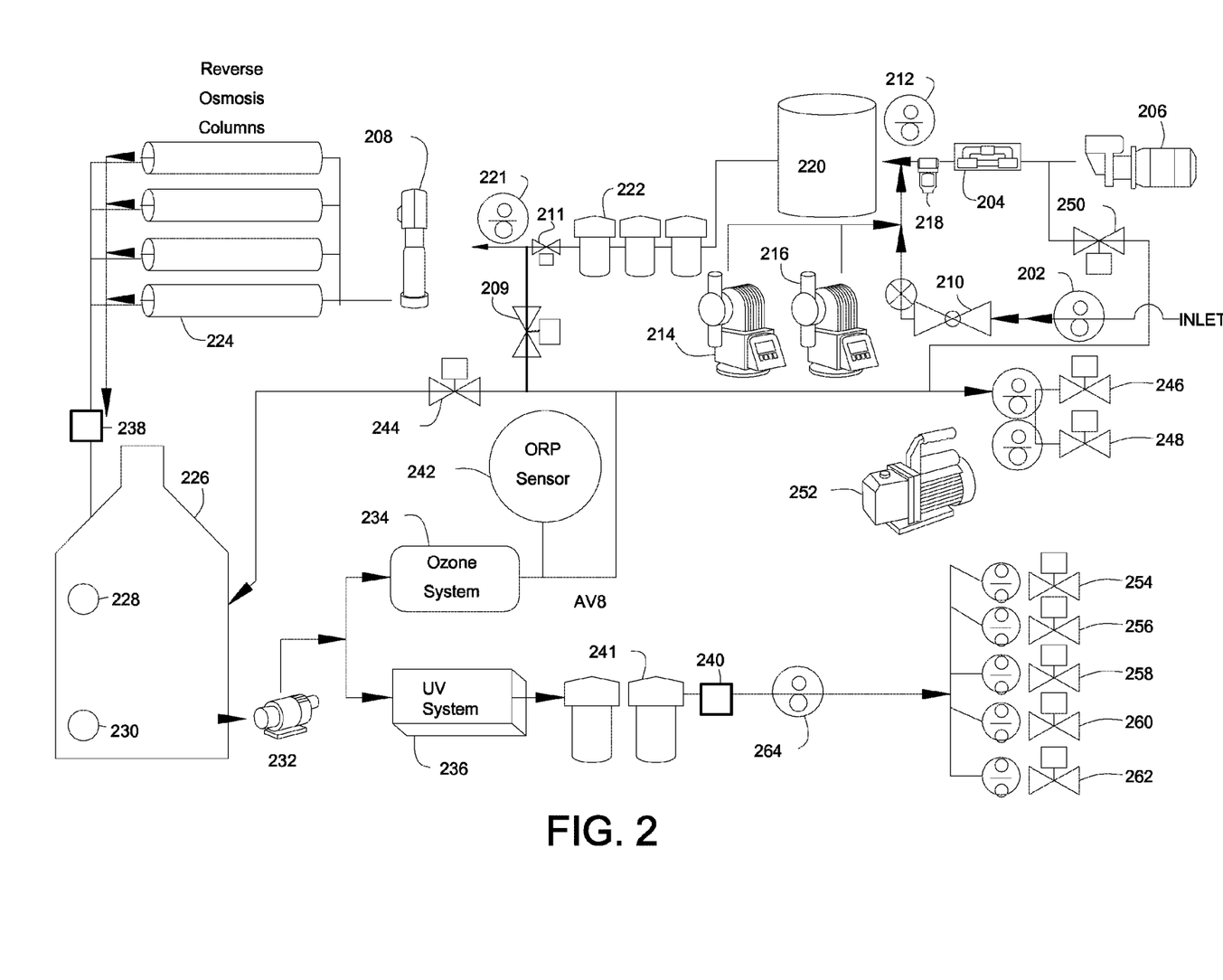
FIG. 2 is a schematic diagram of a system in accordance with the principles of the invention.

FIG. 2 shows a schematic diagram of a system according to the invention. Water is pumped into the system via a suitable submersible (not shown in FIG. 2) which may receive its power and control from a main control board associated with a central controller. The submersible pump is preferably a low voltage pump that may be used to pump water from open water such as a river, lake, sea, ocean, swimming pool, etc. One such manufacturer of suitable submersible pumps is Grundfos, Inc., of Denmark. Such a pump may be implemented together with a raft or other suitable device, as is explained in more detail below in the portion of the specification corresponding to FIGS. 5 and 6.

In the entirety of FIG. 2, water flow is indicated by arrowheaded flow lines. It should be noted that the black lines may indicate polyvinylchloride ("PVC") piping, stainless steel piping or any other suitable piping that may be used to pass water from one location to another location.

In one embodiment of the invention, as long as a first presostat 202 (a presostat is a device that measures whether pressure is above or below a certain predetermined level) which may be located on the water line after inlet pump 206, does not detect pressure at the inlet of the system above a predetermined low pressure threshold, inlet pump 206 and Reverse Osmosis ("RO") high pressure pump 208 do not start working. Maintaining inlet pump 206 and RO high pressure pump 208 in an OFF state until presostat detects a pressure above a predetermined level may be referred to as priming inlet pump 206 and, subsequently, priming RO high pressure pump 208. RO high pressure pump 208 may be implemented using a 3-phase, 60 Hz pump, or diesel powered high-pressure pump. One such RO high pressure pump is the CRN-25 pump manufactured by Grundfos, Inc.

Once water has been pumped into the system using the submersible pump, an optional Venturi device 204 may be placed in line with the water flow. One such Venturi device is the 684 device manufactured by Mazzei Injector Corp. which located in Bakersfield, Calif. Venturi device 204 may be used under certain conditions for introducing ozone ($O_3$) to clean the system, as will also be explained below in greater detail.

When the presostat determines that the pressure at the inlet of the system has reached the low pressure threshold, water may be introduced to the system through fixed pressure regulator ("FPR") 210 at the inlet. From there, the water may be pumped to the portion of the system that is in line with inlet pump 206. [Pump 206 can be any suitable pump; preferably pump 206 is a suitable self-primed, three-phase pump, 60 Hz pump]. Suitable delivery pumps are available from Grundfos, Inc. Preferably, water pressure is increased in the system continuously by pump 206 until a certain point when the water pressure ahead of pump 206 in the system achieves a level that exceeds the low pressure level of presostat 221, which measures the pressure in front of RO pump 208.

Chemical dosage pumps 214 (Anti Scalant, "AS") and 216 (Chlorine, "CL") may be controlled by computerized control in accordance with information provided by flow meter 218. Preferably, the amount of dosage provided by AS pump 214 and CL pump 216, respectively, are substantially continuously dependent, at least in part, on the amount of water flowing through flow meter 218. One such suitable chemical pump is the solenoid driven metering pump manufactured by Tacmina Corp. which is located in Osaka, Japan.

In certain embodiments of the invention, the control of AS pump 214 and CL pump 216 can be administered by the central computerized controller. In some embodiments of the invention, the amount of dosage provided by AS pump 214 and CL pump 216 is also dependent on the various characteristics of the raw water, including but not limited to the temperature of the water and the level of the impurities in the water, and/or the level of organic contaminants in the water and/or the level of TDS in the water (Total Dissolved Solids) and/or the level of hardness derived from various minerals.

The parameters used for implementing AS pump 214 and CL pump 216 are different. Furthermore, the implementation logic of AS pump 214 and CL pump 216 is preferably different.

In preferred embodiments of the invention, following the injection of the anti-scalant and the chlorine to the water, the water is then pushed through multi media filter 220. Typically, such a multi media filter 220 resists the flow of the water. This resistance generates a pressure drop in the water. Accordingly, multi media 220 filter may increase the amount of time required to build sufficient pressure to overcome the low pressure threshold of third presostat 221 (which depends, as least in part, on the specifications of RO pump 208). In order to reduce the time required to build the pressure, the multi media filter 220 may be implemented as a single, preferably stratified filter, that includes various media layers. Alternatively, a multi media filter may be implemented as multi media filters 222. In yet other alternative embodiments, multi media filter 220 may be implemented together with multi media filters 222, as shown in FIG. 2.

It should be noted that even if presostat 221 reaches the low pressure threshold, high pressure RO pump 208 should not be fully powered up before a predetermined delay from the previous shut down of the high pressure RO pump 208.

If high pressure RO pump 208 attempts to power up three times (or another suitable number of attempts) in response to presostat 221 reaching and/or maintaining a pressure level equal to or above the low pressure threshold, then a central computerized controller, such as the system shown in FIG. 1, may send out an error message and reset the system at least in order to prevent hysteresis.

In some embodiments of the invention, reverse osmosis columns 224 can filter water with a level of dissolved solids reaching 45,000 TDS [Total Dissolved Solids in parts per million]. This level of dissolved solids is roughly the equivalent of the level of dissolved solids found in ocean water. Thus, in one embodiment of the invention high pressure RO pump 208 may generate an output stream of water from OS columns 224 containing substantially less minerals and contaminants than are found in the raw water. For the purposes of this application, the water that exits high pressure RO pump 208 (which may be referred to herein for the purposes of this application as "pre-osmosis water") and is then introduced into the osmosis columns 224.

The osmosis water is the product water that exits from the osmosis columns and is delivered into buffer tank 226. The delivery to buffer tank 226 is preferably governed by the controller based on the position of the buoys (see below for a more detailed description of the buoys). Such a measure preferably protects the system from entering a state of hysteresis.

Buffer tank 226 may contain two buoys: one on the highest level float ("HLF") 228 and one on the lowest level float ("LLF") 230.

Delivery pump 232 takes the water from buffer tank 226 and generates sufficient pressure to run the water through the post-treatment process and into the product end of the system.

In response to receiving an OFF signal from LLF 230—i.e., an indication that the water level in buffer tank 226 is under a predetermined minimum level—the computerized controller preferably stops pump 232 from taking water out of the buffer tank and, preferably in parallel, cuts off power to UV polishing 236 and, in certain embodiments of the invention, allowing other conditions dictate control over ozone system 234.

In response to HLF 228 being in the ON position—i.e., the water level is over the maximum—the computerized controller should stop pumps 206, 208 and the submersible pump (not shown in FIG. 2) from bringing water into the buffer tank. In addition, HLF 228 can also generate a command that can close low pressure valve 209.

Valve 209 can be a manual or electrical low-pressure valve controlled by a specific "high TDS" parameter received in the controller and a threshold determination of electro-conductivity in the water that exits the osmosis membrane above a predetermined value such as 300 micro Siemens. Valve 211 may also be utilized under the same parameters as valve 209—i.e., a high TDS parameter and a threshold determination of electro-conductivity in the water that exits the osmosis membrane. In preferred embodiments of the invention, valve 211 is 180° out of phase with valve 209—i.e., valve 209 is typically closed and valve 211 is typically open except when the above-described parameters are satisfied, then valve 209 should be open and valve 211 should be closed.

The water may be measured for electro-conductivity by suitable devices shown schematically at electro-conductivity sensors 238 and 240, respectively.

In addition to the mineralization of the water, removal of impurities in the water may be performed by the system. Electro-conductivity of water samples may be used as an indicator of how salt-free or impurity-free the sample is; the purer the water, the lower the conductivity. At sensor 238, the water may be measured to determine the electro-conductivity of the water going from RO pump 208 into buffer tank 226. At sensor 240, the flowing water may be measured to determine the conductivity of the water before the water is used to fill water bottles.

In certain embodiments of the invention, as long as the electro-conductivity of the water at sensor 238 is under 300 microsiemens, reverse osmosis may provide an output that is considered within predetermined parameters. Otherwise, the system may generate a warning that the water contains a higher than allowable level of electro-conductivity. The warning may be audio, video or some other computer-generated warning. In some cases, a closed loop may be employed to run the osmosis water exiting from the first three osmosis columns through a second stage osmosis using the other column, or in some other suitable combination of the columns, to ensure quality treatment even under adverse conditions.

Because a system according to the invention may be used to treat water of an indeterminate nature—i.e., that may vary between a TDS of about 500 to a TDS of about 40,000—the reverse osmosis process according to the invention may generate water with electro-conductivity of between about 0 and about 300 TDS. Such water is difficult to mineralize using standard methods. One method according to the invention for treating water of such an indeterminate nature may require the use of mineralization chambers 241 containing such minerals (which may include salts such as Sodium Chloride, Magnesium Chloride, Copper Oxidant, Zinc) in a form that releases the desirable minerals into the water in inverse proportion to the level of the electro conductivity of the water.

When the water is measured at sensor 240 to be between, for example, about 300 Micro Siemens and about 500 Micro Siemens, the mineralization is considered to have been properly implemented. Otherwise, the system may generate a warning that the water contains a lower than or higher than allowable level of electro-conductivity. The warning may be audio, video or some other computer-generated warning. A lower than allowable warning may indicate that the minerals in the mineralization chambers 241 may require replenishment.

It should be noted that the heretofore described system and process refers, for the most part, to the removal of inorganic contaminants. Nevertheless, it is also important to remove all types of contaminants such as bacteria, algae, viruses, fungi, other microorganisms and any organic compounds from the raw water.

Following delivery pump 232, a portion of the water, or all the water, may be run through a loop. The loop may include ozone system 234 and an oxidation reduction potential ("ORP") sensor 242. The greater the presence of ozone in the water, the higher the level of the ORP that sensor 242 will detect. The loop may then be completed by returning the water to buffer tank 226 via valve 209. Such a loop may allow the ozone in the water, and in the tank, to be increased, or decreased, to a predetermined level.

In certain embodiments of the invention, the level of ozone generation depends at least in part on two variables. The ozone generator receives an analog input signal—e.g., of between 4 and 20 milliampere—from the computerized controller. This signal may be dependent on other system variables. This signal may be provided by the computerized controller in response to numerous system requirements in light of the various purposes that the ozone is being used to achieve.

Another of the variables that affects the ozone generation is the water flow at the point of injection. The water flow through the system generates suction to cause air to flow through the ozone generation system based on a Venturi injection principle.

As noted above, the ozone system may add ozone ($O_3$) to the water. Ozone may be added to the water to achieve a number of different purposes. These purposes may include preparing the water to wash the bottles, treating (cleaning) the buffer tank against bacteria and/or other organic compounds, treating (cleaning) the system prior to (or concurrent with) a period of non-activity, or, in cases of high bacterial concentration of the raw water, providing a shock treatment to pre-treat the water prior to the multi-media filtration. Each of the purposes, or other suitable purposes, may require a unique, predefined, computerized controller-implemented, preferably feedback-controlled level of ozone concentration in the water. Since usage of high concentration of ozone may generate undesirable by-products, the invention may optionally include an electrochemical method such as specific electrolysis to increase the level of free single atom oxygen ions in the water.

Ozone concentration is typically measured in terms of reduction potential ("Redox") or ORP (as stated above). In addition to being proportional to the amount of water flow, ozone injection may also be inversely proportional (though not necessarily linearly inversely proportional) to the water temperature, and/or contamination level.

Valve 244 preferably determines whether, or to what extent, water is directed back to buffer tank 244 and to what extent water is directed to valves 246 and 248 which are associated with bottle washing stations. It should be noted that at least some of the purposes may be achieved substantially simultaneously. Alternatively, a number of the purposes may be achieved partially simultaneously whereby one of the purposes may be achieved before the other purpose is achieved and/or may terminate before the completion of another of the other purposes. In yet another alternative, the purposes may be achieved independently of one another.

In an embodiment of the invention, a manual valve (not shown) may be opened prior to the use of the ozone system for the purposes of cleansing the greater system prior to, or concurrent with, a period of non-activity. Such a valve preferably allows concentrated ozone gas to travel from ozone system 234 to Venturi device 204. Venturi device 204 preferably allows the introduction of ozone to the water close to the system inlet from the submersible pump. This path may be implemented using additional piping or tubing as needed.

Valves 246 and 248 may preferably be used for bottle washing stations. Upon opening of one or both of valves 246 and 248, suction pump 252 can be selectively activated. The suction may be used to remove the ozonated washing water and gases from the bottles.

When the valves are closed, the suction can be configured by the computerized controller to remain ON for an additional pre-determined amount of time. One purpose of maintaining the suction for a period of time following the closing of the valves is to add additional suction in order to purge the bottle of all the ozonated water. Also, the suction can further purge whatever ozone gas had been released into the air inside the bottle as well as the ozone within the bottle washing components.

Drinking water may be obtained from the product end of the system, which includes UV system 236, mineralization chambers 241, electro conductivity sensor 240, and dispensing valves 254-262.

UV system 236 may have a number of purposes. One purpose is to serve as a back-up system to ozone system 234 for the purpose of killing bacteria. Another purpose of UV system 236 may be for utilizing UV to energize the dissolved ozone in the water. The energizing of the ozone may cause most of the ozone to be broken down in order to reduce the level of dissolved ozone in the product water to a level which is approved for drinking by the FDA (United States Food and Drug Administration) or to some other predetermined specification.

Electro-conductivity sensor 240 preferably measures the electro-conductivity in the water after mineralization to ensure proper mineralization of the water prior to dispensing. An electro-conductivity level of the water that is outside a predetermined range may generate a computer-controlled warning and may stop the water dispensing. In certain embodiments of the invention, the warning, and, preferably, concurrent stopping of dispensing, at least may be manually overridden for the purpose of purging the system of the non-desirable water.

Fourth presostat 264 (which may be not in line with the water for dispensing) may generate a warning if the water is below a predetermined pressure threshold. Furthermore, in response to a signal from presostat 264 that the water is below a predetermined threshold, the central computing control may disable valves 254-262.

In one embodiment of the invention, maintaining substantially constant pressure, as measured by presostat 264, may allow each of the dispensers to dispense water at a known, predetermined pressure. This further allows the dispensing valves associated with each of the dispensers to dispense water for a predetermined time, thereby allowing each of the valves to be configured for a specific bottle size. As such, one or more of the dispensers can be configured for a first bottle size and a second, or more, dispenser can be configured for a second bottle size. This can be accomplished by providing the dispensers with valves that may be opened for a predetermined amount of time following activation.

Figure 3:
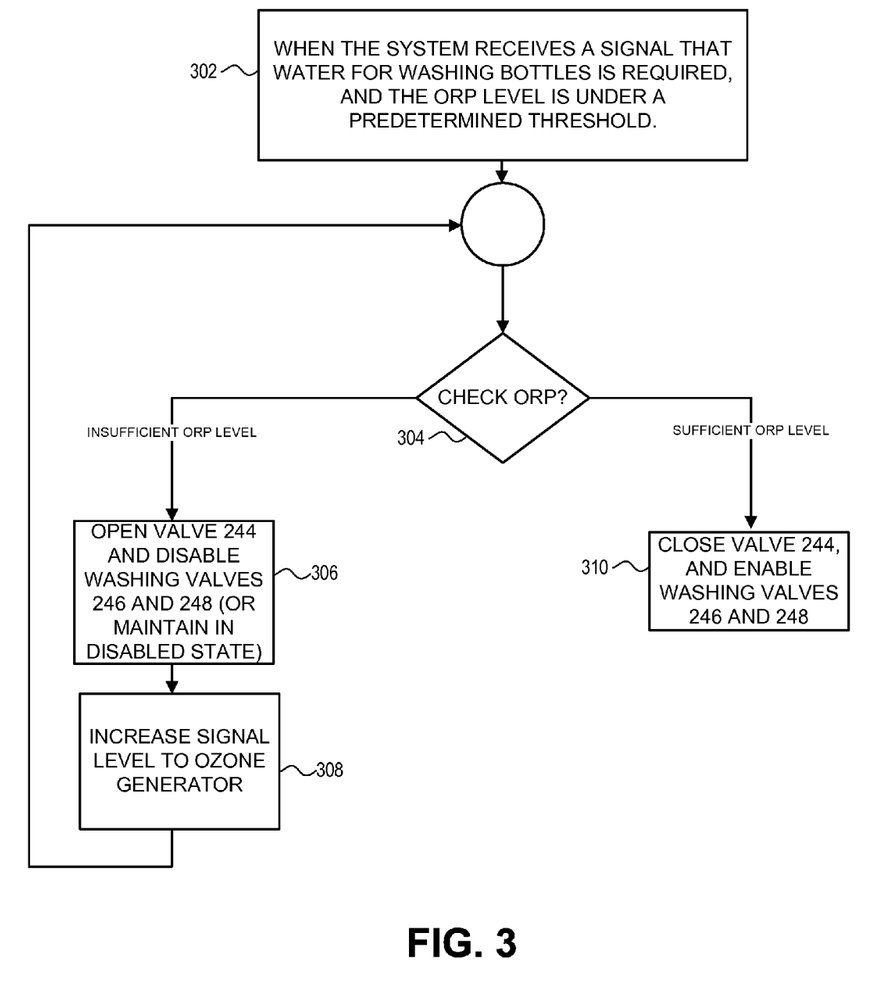
FIG. 3 shows an illustrative flow diagram of a method that may be implemented in the system shown in FIG. 2.

FIG. 3 shows a subroutine that may be implemented in a computerized controller according to the invention. Box 302 shows a condition under which the system receives a signal that water for washing bottles is required, and the ORP level is under a predetermined threshold. In such a condition, the system may preferably query, or otherwise identify, the level of ORP, as shown in query 304.

If the ORP level is insufficient—i.e., the water is not sufficiently ozonated—for washing bottles, then box 306 shows opening valve 244 and disabling washing valves 246 and 248 (or maintaining the valves in a disabled state). Thus, the water in the system will loop back through buffer tank 226 followed by another injection of ozone by ozone system 234. Such injection may preferably increase ozone generation in response to an increase by the computerized controller of the ozone generation signal, as shown in box 308.

If the ORP level is sufficient for washing bottles, as shown in box 310, valve 244 may be closed and washing valves 246 and 248 may be enabled.

It should be noted that the process in FIG. 3 may also be used to provide highly ozonated water by diverting the water to dispense for use in treating chemical warfare victims who have become contaminated. Such water may preferably be dispensed to a special dispenser that allows direct access to the highly ozonated water.

Figure 4:
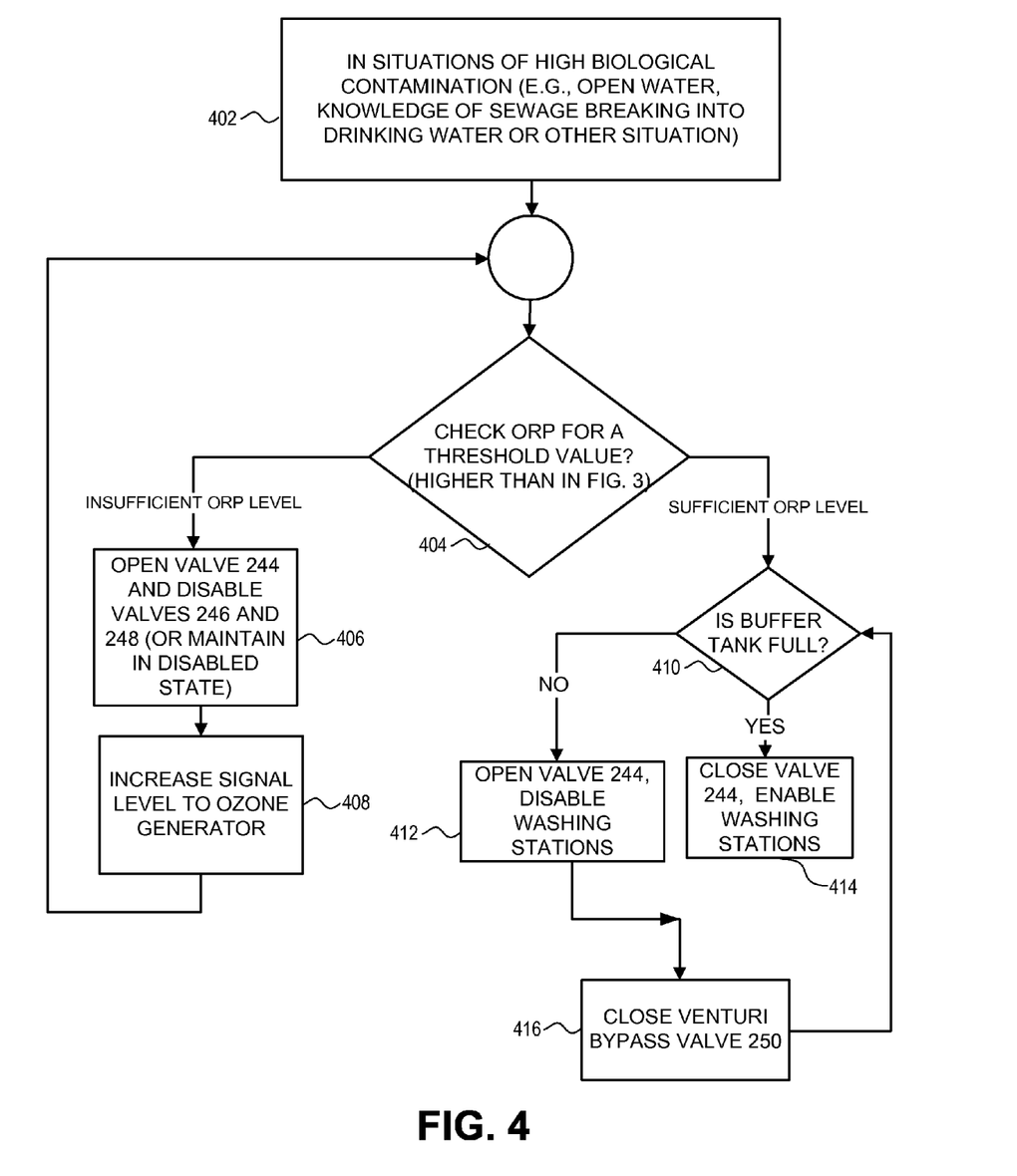
FIG. 4 shows an illustrative flow diagram of another method that may be implemented in the system shown in FIG. 2.

FIG. 4 shows an illustrative flow diagram of another method that may be implemented in the system shown in FIG. 2. The subroutine illustrated in FIG. 4 may be implemented in situations of known high biological contamination such as with open fresh water, or with knowledge of sewage breaking into drinking water or other similar situation, as shown in box 402.

Box 404 shows checking ORP for a value that it typically relatively higher than the value checked for in query 304 of FIG. 3. If the ORP is insufficient—i.e., the ozone level of the water is insufficient to treat such known high levels contamination, then the same loop as described above with respect to boxes 306 and 308 is followed, as shown in boxes 406 and 408.

However, the process followed if the ORP is sufficient in FIG. 4 is different from the process followed if the ORP is sufficient in FIG. 3. First, the system shows querying whether the buffer tank is full, as shown in box 410. If the buffer tank is full, then box 412 shows closing valve 244 and enabling washing stations. If the buffer tank is not full, then the step shown in box 410 is followed by opening valve 244, in order to allow water to run into buffer tank, and disabling the washing stations. This loop is followed until the buffer tank is sufficiently full.

Figure 5:
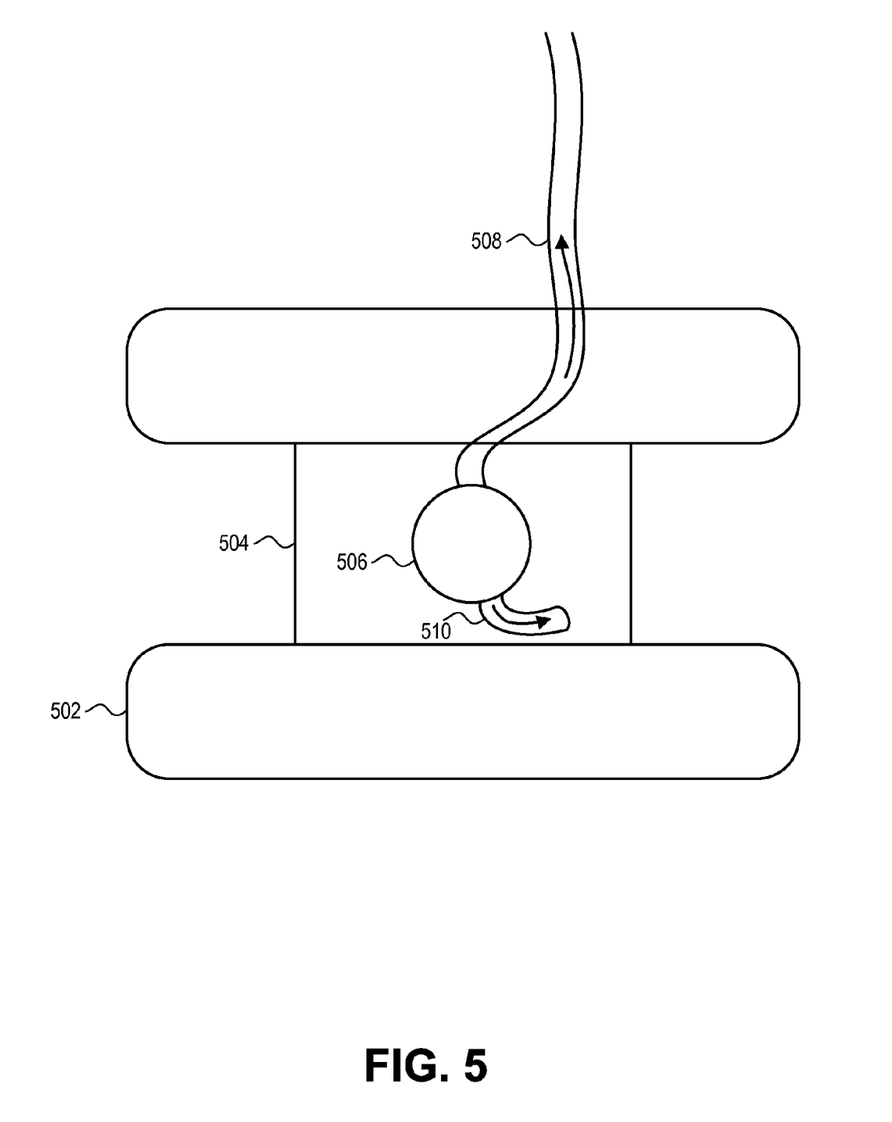
FIG. 5 shows a top plan view of a raft according to the invention that may be used for drawing open water for water purification.

FIG. 5 shows a top plan view of an embodiment of a raft that may be used together with the system shown in FIG. 2 to draw water from open water sources. Pontoons 502 are typically connected by a platform such as platform 504. Light 506 may be installed at the top of pump column (which is shown in more detail in FIG. 6). Output pipe 508 may typically carry the water to an on-shore system, such as the system shown in FIG. 2, for further processing, as described in more detail above. Refuse pipe 510 may preferably direct any refuse away from the water intake that was drawn in by the submersible pump (not shown in FIG. 5) located on the raft, as shown in more detail in FIG. 6.

Figure 6:
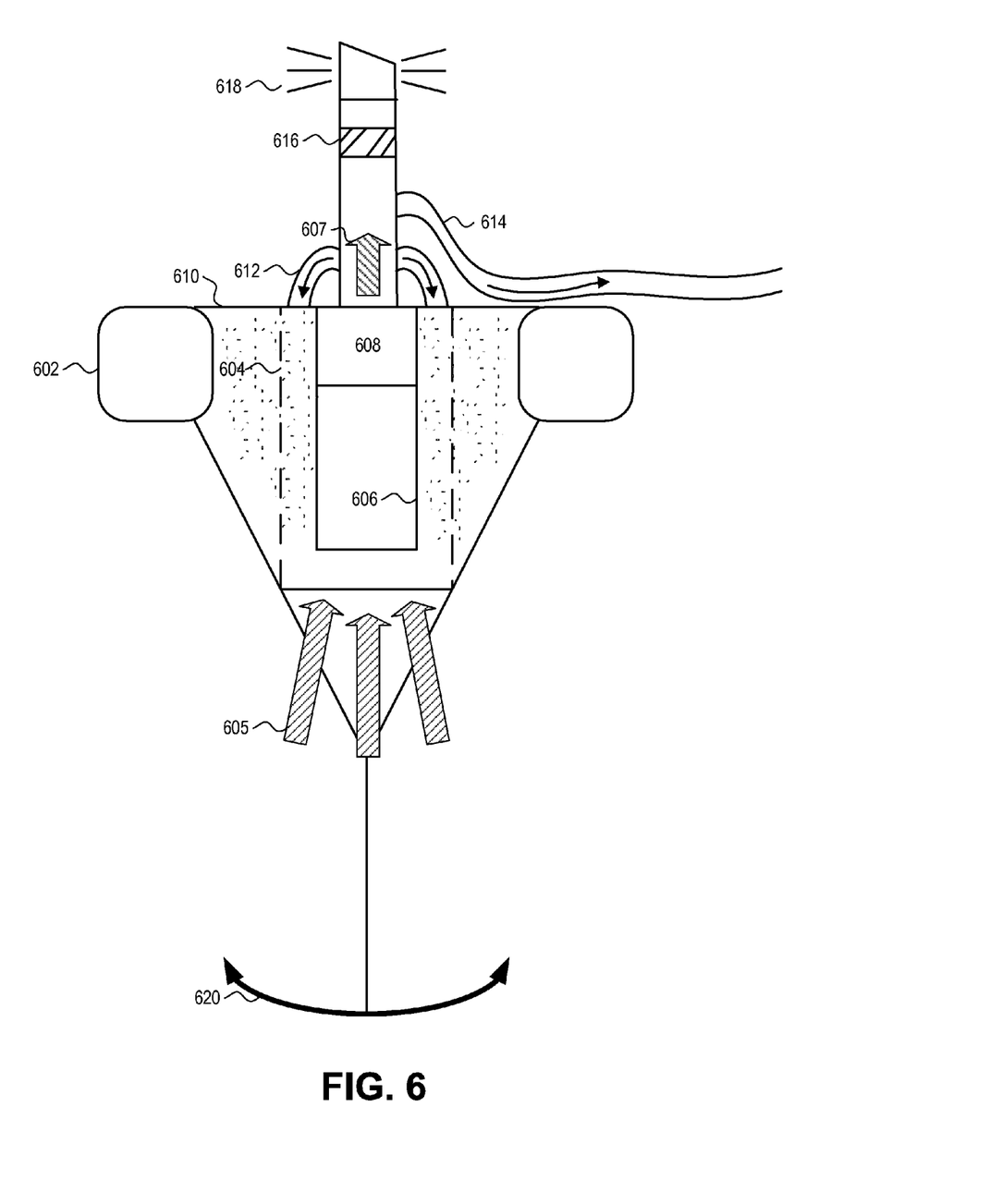
FIG. 6 shows a side view of the raft according to the invention.

FIG. 6 shows a side view of a raft according to the invention. The raft may include pontoons 602, a platform 610, a double-walled intake pipe including a perforated exterior intake wall 604 and a solid interior intake wall 606, a submersible pump 608, refuse pipes 612, output pipe 614, marker 616, light 618, and anchor (or, alternatively, other fixation device) 620.

In one embodiment of the invention, light 618 may flash. Light 618 may also be powered by solar panels. The solar panels may be backed up by a battery. The flashing light may provide a visual indicator of the location of the raft.

The raft preferably operates as follows: in response to the pumping action of pump 608, water is drawn into the double walled intake pipe at 605. Thereafter, the water pushed by pump 608 up the pump column to point 607.

A water centrifuge may be used to separate refuse from the water at 607. The refuse is redirected away from water flow 607 through refuse pipes 612. After flowing through refuse pipes 612, the refuse is located between perforated exterior intake walls 604 and solid interior intake walls 606. The refuse then is blocked from being taken up in water flow 605. Accordingly, new water that is taken up in water flow 605 remains free of the refuse.

The invention may be described in the general context of computer-executable instructions, such as program modules, being executed by a computer. Generally, program modules include routines, programs, objects, components, data structures, etc., that perform particular tasks or implement particular abstract data types.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for providing versatile water purification according to the invention have been provided. Persons skilled in the art will appreciate that the present invention can be practiced by other than the described embodiments, which are presented for purposes of illustration rather than of limitation, and the present invention is limited only by the claims which follow.

What is claimed is:
1. A method for purification of water comprising:
    floating a raft on a source of water, the water to be purified, the raft associated with a device;
    activating the device;
    pumping, under computerized control water from the source to now through an inlet of the device;
    selectively injecting, under computerized control, prior to filtration, a chemical pre-treatment into the flowing device-pumped inlet water;
    pumping, under computerized control, the inlet water into a multi media filter;
    filtering the inlet water using the multi media filter to provide filtered water;
    pumping, under computerized control, the filtered water into a plurality of reverse osmosis columns, said columns for converting the filtered water into an osmosis water having less particulate matter and less dissolved contaminant than the filtered water;
    receiving the osmosis water from the reverse osmosis columns in a buffer tank;
    pumping, under computerized control, water from the buffer tank;
    selectively injecting ozone, under computerized control, into the water pumped from the buffer tank to form ozonated water;
    selectively passing, under computerized control, the ozonated water from the ozone system back to the buffer tank via a first valve;
    selectively passing the ozonated water, under computerized control, from the ozone system to a washing station via a second valve, the washing station for washing a receptacle in preparation for dispensing into the receptacle water dispensed by the device;
    passing water from the buffer tank to an Ultra Violet ("UV") system and inactivating bacteria in the water received from the buffer tank using the UV System; and
    selectively adding minerals to the water from the IN system prior to dispensing the water from the device.

2. The method of claim 1 further comprising sensing the level of particulate and dissolved matter in the osmosis water.

3. The method of claim 1 further comprising sensing the level of dissolved matter in the water following the adding minerals to the water.

4. The method of claim 1 further comprising monitoring the level of ozone in the ozonated water.

5. The method of claim 1 further pumping chlorine into the water pumped by a first delivery pump.

6. The method of claim 1 further pumping an anti sealant substance into the water pumped by a first delivery pump.

7. The method of claim 1 further comprising selectively reversing the water flow to clean the filter.

8. A method for purification of water comprising:

activating a transportable device associated with a source of water, the water to be purified;

pumping, under computerized control, water from the source to flow through an inlet of the device;

selectively pumping, under computerized control, directly prior to multi media filtration, a chemical pre-treatment into the flowing post-inlet water;

pumping, under computerized control, the selectively pre-treated water into a multi media filter;

filtering the inlet water using the multi media filter to provide filtered water;

pumping, under computerized control, the filtered water into a plurality of reverse osmosis columns, said columns for converting the filtered water into an osmosis water having less particulate and dissolved matter than the filtered water;

receiving the osmosis water from the reverse osmosis columns in a buffer tank;

pumping, under computerized control, water from the buffer tank;

selectively injecting ozone, under computerized control, into the water pumped from the buffer tank to form ozonated water;

selectively passing, under computerized control, the ozonated water from the ozone system back to the buffer tank via a first valve; selectively passing the ozonated water, under computerized control, from the ozone system to a bottle washing station via a second valve; and passing water from the buffer tank to an Ultra Violet ("UV") system and inactivating bacteria in the water received from the buffer tank using the UV System.

9. The method of claim 8 further comprising sensing the level of particulate and dissolved matter in the osmosis water.

10. The method of claim 8 further comprising adding minerals to the water from the UV system prior to dispensing the water from the device.

11. The method of claim 8 further sensing the level of oxidant in the ozonated water.

12. The method of claim 8 further pumping chlorine into the water pumped by a first delivery pump.

13. The method of claim 8 further pumping an anti sealant substance into the water pumped by a first delivery pump.

14. The method of claim 8 further comprising selectively reversing the water flow to clean the filter.

15. The method of claim 8 wherein the transportable device associated with the source of water comprises the device having been transported to the source of water.

16. The method of claim 8 wherein the associated with the source of water comprises the device being partly submerged in the source of water.

17. The method of claim 10 further comprising sensing levels of dissolved matter in the water following the adding minerals to the water.

18. The method of claim 16 further comprising the device at least partly floating in the source of water.

* * * * *